United States Patent
Medico, Jr.

[11] 3,898,979
[45] Aug. 12, 1975

[54] SOLAR HEAT COLLECTOR

[76] Inventor: John J. Medico, Jr., 5331 Cape Leyte Dr., Siesta Key, Sarasota, Fla. 33581

[22] Filed: Mar. 20, 1974

[21] Appl. No.: 452,732

[52] U.S. Cl. ............................................. 126/271
[51] Int. Cl.² ......................................... F24J 3/02
[58] Field of Search ................................. 126/271

[56] References Cited
UNITED STATES PATENTS

| | | | |
|---|---|---|---|
| 2,311,579 | 2/1943 | Scott | 126/271 |
| 2,316,191 | 4/1943 | Scott | 126/271 |
| 3,039,453 | 6/1962 | Andrassy | 126/271 |
| 3,144,228 | 7/1965 | Bargues | 126/271 |

Primary Examiner—W. F. O'Dea
Assistant Examiner—Peter D. Ferguson

[57] ABSTRACT

The present invention embodies a solar heat collector for heating any suitable fluid, but preferably water for domestic use in a house, for heating a swimming pool, etc. and it comprises a collecting box having a layer of flexible insulating material, such as shredded asbestos, foam rubber or the like upon which is placed a thin sheet of metal of high thermal conductivity, such as copper, aluminum, etc. A fluid conducting coil formed of high thermal conducting metal, preferably of the same metal of which the sheet of metal on the insulation is formed. The coil is connected to a source of supply of water or other suitable fluid and either to a domestic item, such as a water heater for supplying hot water for domestic use, to a swimming pool or to a suitable insulated storage container from which it is drawn for subsequent use. The flexibility of the insulation and the flexibility of the metal sheet upon which the coil rests allows the weight of the coil to deform the sheet, i.e. to form a close firm contact between the thin sheet of metal and a portion of the tubes resting thereon, thus imparting solar heat collected by a thin sheet of metal to the tubes augmenting their collection of solar heat and providing increased heating of the fluid in the tubes.

5 Claims, 2 Drawing Figures

3,898,979

SOLAR HEAT COLLECTOR

The tubes and thin sheet of metal may be bonded together by a suitable thermal heat transfer material, such as solder to increase the heat transfer from the sheet to the tubes if it is so desired; also the entire surfaces of the thin sheet of metal and the coiled tubing may be coated with any suitable black heat absorbing material such as lamp black to enhance absorption of heat to the thin sheet of metal and the coiled tubing.

The container or box in which the insulating material thin sheet of metal and coil are placed has a covering over its upper open surface which covering is formed of a sheet of transparent plastic or a glass plate to permit the absorption of solar heat by the coil and thin metal sheet.

The present invention relates to collectors of solar heat for heating water, for domestic use, such as for heating a house, heating hot water for bathing and other purposes in a home, heating the water in a swimming pool or for other uses where heated water or other fluids may be used and the primary object of the invention is to provide a solar heat collector which, while comparatively simple in construction, will provide a maximum transfer of solar heat from the atmosphere to a fluid to be heated as well as one which is so constructed that it may be embodied in the roof construction of a house, in single or multiple units, depending upon the quantity of heated water desired without distracting from the appearance of the roof.

Many solar heaters embodying coils through which the fluid to be heated passes and which coils are placed in suitable boxes or containers with a transparent covering through which the solar heat passes to heat the coils are well known, but the present invention embodies novel features of construction, such as a thin sheet of thermal heat absorbing metal upon which the coils rests and this thin sheet of metal rests upon a layer of flexible insulating material, thus permitting the weight of the coil to sink towards the flexible insulating material, deforming the sheet metal to provide complete surface contact between the under surface part of the coil and the thin sheet of metal to permit transfer of absorbed heat from the thin sheet of metal to the tube or coil and consequently to the fluid flowing therethrough. If it is so desired the thin sheet of metal may be bonded to the coil at their points of contact by a suitable thermal heat transferring bonding material, such as solder to further insure the transfer of heat from the thin metal sheet to the coil.

With these and other objects in view, as may appear from the accompanying specification, the invention consists of various features of construction and combination of parts, which will be first described in connection with the acompanying drawings, showing a solar heat collector of a preferred form embodying the invention and the features forming the invention will be specifically pointed out in the claims.

Figure 1:
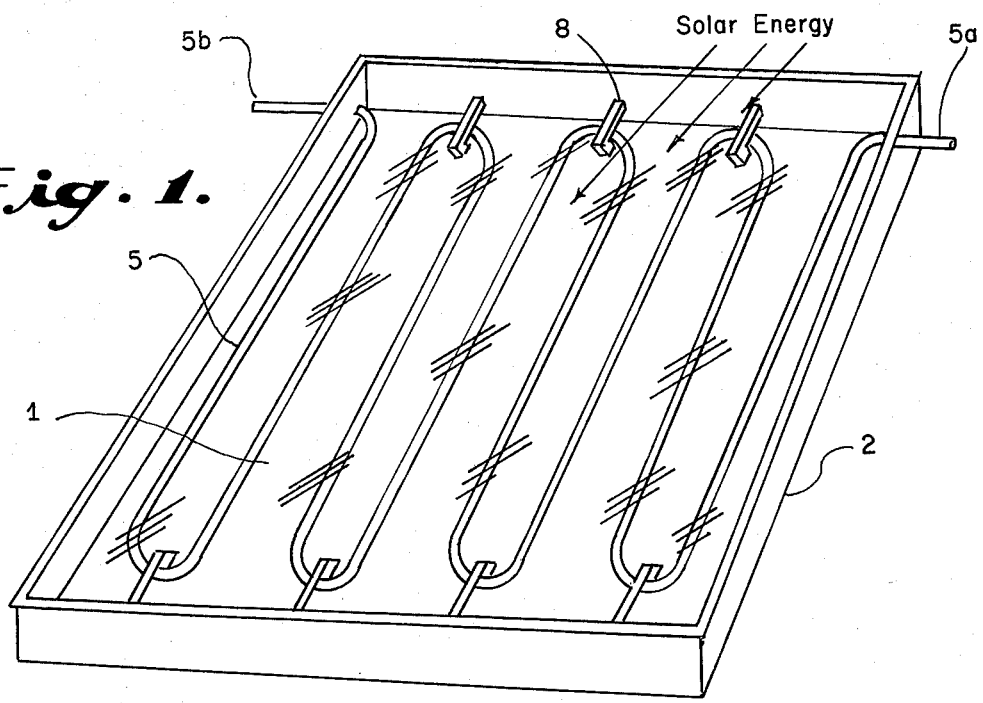
FIG. 1 is a perspective view of the solar heat collector.
Figure 2:
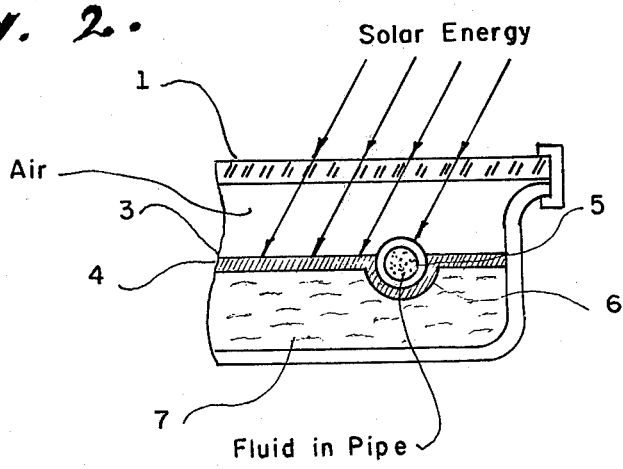
FIG. 2 is a cross sectional view taken on the line 2—2 of FIG. 1.

Referring more particularly to the drawings the solar heat collector includes a tray or box 2, the upper open side of which is closed by a transparent clear window 1. The tray or box 2 contains therein the elements of the solar or thermal heat units and will hereinafter be called the container 2.

A layer of flexible insulating material 7 is placed in the container at the bottom thereof and may be formed of shredded asbestos, highly flexible rubber, or the like.

A thin sheet 3 of suitable metal having a high thermal conductivity, such as copper, is placed over the layer of insulating material. While copper is specifically mentioned herein, any metal having a high thermal conductivity may be used. The thin sheet 3 of metal is highly flexible due to its thinness and may have its upper surface coated with lamp black or other suitable black material having a high heat absorbtivity.

A coil of tubing 5 through which the water or other fluid to be heated passes is placed in the container 2 and has suitable inlet $5^a$ for cool water and a suitable outlet $5^b$ for heated water out of the container 2. The coil 5 is formed of suitable metal having a high heat conductivity and it rests upon the thin metal sheet 3. The weight of the coil 5 will cause it to deform the thin metal sheet 3 due to the flexibility of the insulating material upon which the thin sheet 3 rests, thus providing surface to surface contact between the entire length of the coil and the thin sheet 3 to provide heat conducting relationship between the sheet and tubing coil.

If it is found desirable, the thin metal sheet 3 and the tubing of the coil may be bonded together by a thermal heat conducting material so as to insure complete contact all along the coil 5 with the metal sheet 3 and thus enhance the transfer of absorbed solar heat from the metal sheet 3 to the tube coil 5 and provide increased heating to the fluid flowing through the coil.

The thin sheet 3 and the coil tubing 5 may be coated with a black coating of thermal heat absorbing material such as lamp black.

Holding blocks 8 hold the coil in its proper place within the container.

To achieve maximum absorption of solar energy through the transparent window 1, it is made of a material which passes the maximum band width of solar spectrum. As an example, a thermoplastic material which passes the ultraviolet portion of the spectrum as well as the infra-red including the visible region is fully utilized.

The solar heater collector of the present invention is constructed of a size to be relatively conveniently handled and installed, each single unit being of such size as to provide an approximate amount of heat to an approximate amount of water to be heated and these collector units may be connected in multiple, either in series or in parallel relation as desired to increase the heating capacity for increasing the quantity of water of other fluid heated or when connected in series to increase the ultimate temperature of the heated fluid.

The water heated by the solar heat collector may be used for such in house domestic use as a normal use of water in a home, such as bathing, showering and other common uses of hot water in a home and in some instances it may be provided in the heating systems of the home, either to wholly heat the home or to provide an initial heated temperature of the water which may be subsequently raised by fuel heating, thus resulting in a considerable savings of energy heating material. The heated water may be used to melt ice from side walks, of driveways by passing the heated fluid through suitable conduits in sidewalks or driveways. It may be used for heating swimming pools, stored in heat insulated containers for future use, etc.

Because of solar heater system is compact and because of its high efficiency of operation, it can be conveniently integrated in home architectural design without degrading the appearance of the structure.

It will be understood that the invention is not to be limited to the specific construction or arrangement of parts shown, but that they may be modified within the invention defined by the claims.

What is claimed is:

1. A solar heat collector for heating a fluid embodying a container, a layer of flexible insulating material in said container, a thin flexible sheet of metal resting upon said flexible insulating material, a fluid conducting coil of metal having a high thermal conductivity resting upon said thin sheet of metal deforming portions of said thin sheet of metal and forcing said deformed portions into said flexible layer of insulating material to cause intimate contact between the coil and said thin sheet of metal to allow heat transfer from the thin sheet of metal to the coil, and a transparent cover over the top of said container constructed of material which passes the maximum band width of solar spectrum to the coil.

2. A solar heat collector for heating a fluid embodying a container as claimed in claim 1, wherein said layer of insulating material is formed of granular particles to facilitate intimate contact between the coil and the thin flexible sheet of heat absorbing metal.

3. A solar heat collector for heating a fluid embodying a container as claimed in claim 2, wherein said tubing and said thin sheet of metal are coated with a heat absorption black material.

4. A solar heat collector for heating a fluid embodying a container as claimed in claim 1, wherein said thin sheet of metal is bonded to said metal coil by a heat transfer bonding material to enhance the transfer of heat from the thin sheet to the coil.

5. A solar heat collector for heating a fluid embodying a container as claimed in claim 1, wherein said transparent cover is constructed of a material which passes the ultra-violet portion of the solar spectrum, as well as the infra-red, including the visible region.

* * * * *